US 8,135,357 B1

(12) United States Patent
Chang et al.

(10) Patent No.: US 8,135,357 B1
(45) Date of Patent: Mar. 13, 2012

(54) INTEGRATED TRANSMITTER/RECEIVER SWITCH WITH IMPEDANCE MATCHING NETWORK

(75) Inventors: Richard T. Chang, Santa Clara, CA (US); David Weber, Santa Clara, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 1366 days.

(21) Appl. No.: 11/300,773

(22) Filed: Dec. 13, 2005

(51) Int. Cl.
*H04B 1/44* (2006.01)

(52) U.S. Cl. ............... 455/83; 455/78; 455/82; 455/73; 455/101; 363/62; 363/60; 363/44; 333/100; 333/101; 330/286; 330/302; 330/140; 331/167; 331/49; 323/341; 323/266; 345/89; 345/98

(58) Field of Classification Search ............ 455/78–83, 455/101, 272, 240.1; 375/347; 101/272; 333/100–101; 363/62, 60, 44; 330/286, 330/302, 140; 331/167, 49; 323/371, 266; 345/89, 98
See application file for complete search history.

(56) References Cited

U.S. PATENT DOCUMENTS

| | | | | |
|---|---|---|---|---|
| 3,701,991 | A * | 10/1972 | Livesey | 346/9 |
| 4,122,957 | A * | 10/1978 | Allen et al. | 414/281 |
| 5,017,914 | A * | 5/1991 | Uchida et al. | 345/89 |
| 5,054,114 | A * | 10/1991 | Erickson | 455/78 |
| 5,157,386 | A * | 10/1992 | Uchida et al. | 345/89 |
| 5,726,870 | A * | 3/1998 | Lavieville et al. | 363/62 |
| 5,828,561 | A * | 10/1998 | Lavieville et al. | 363/62 |
| 5,969,960 | A * | 10/1999 | Tachon et al. | 363/60 |
| 6,014,122 | A * | 1/2000 | Hashimoto | 345/98 |
| 6,122,082 | A * | 9/2000 | Fishman | 398/1 |
| 6,424,223 | B1 * | 7/2002 | Wang et al. | 330/286 |
| 6,466,094 | B2 * | 10/2002 | Leighton et al. | 330/302 |
| 6,532,579 | B2 * | 3/2003 | Sato et al. | 716/121 |
| 6,882,829 | B2 | 4/2005 | Mostov et al. | |
| 7,092,679 | B2 * | 8/2006 | Khorram | 455/78 |
| 7,173,495 | B1 * | 2/2007 | Kenny et al. | 331/49 |
| 7,197,284 | B2 * | 3/2007 | Brandt et al. | 455/78 |
| 7,269,391 | B2 * | 9/2007 | Chiu et al. | 455/83 |
| 7,315,152 | B1 * | 1/2008 | Epperson et al. | 323/271 |
| 7,340,235 | B1 * | 3/2008 | Madsen et al. | 455/240.1 |

(Continued)

OTHER PUBLICATIONS

Talwalkar et al.: "Integrated CMOS Transmit-Receive Switch Using LC-Tuned Substrate Bias for 2.4 GHz and 5.2 GHz Applications", IEEE Journal of Solid-State Circuits, vol. 39, No. 6, Jun. 2004, pp. 863-870.

(Continued)

*Primary Examiner* — Nay A Maung
*Assistant Examiner* — April G Gonzales
(74) *Attorney, Agent, or Firm* — Bever, Hoffman & Harms, LLP

(57) ABSTRACT

A switchable inductor-capacitor-inductor (L-C-L) network, which includes an integrated T/R switch, can advantageously bridge a PA and an LNA of a wireless device. The first inductor can function as an RF choke that provides power to the PA. In one embodiment, the first inductor can be advantageously implemented using the bond wires already attached to the PA, thereby requiring no additional inductors to provide the integrated T/R switch and minimizing use of valuable silicon area. The second inductor can function as a source inductor for and cancel an input parasitic capacitance of the LNA. A set of capacitors can act as blocking capacitors to provide DC isolation between the LNA and the PA, thereby protecting the LNA from high voltages. The L-C-L network can also advantageously function as an impedance matching network for at least one of the PA and the LNA.

17 Claims, 1 Drawing Sheet

U.S. PATENT DOCUMENTS

| | | | | |
|---|---|---|---|---|
| 7,375,989 | B2* | 5/2008 | Colombi et al. | 363/44 |
| 7,474,081 | B2* | 1/2009 | Colombi et al. | 323/266 |
| 2002/0097094 | A1* | 7/2002 | Wang et al. | 330/286 |
| 2002/0125955 | A1* | 9/2002 | Leighton et al. | 330/302 |
| 2004/0253939 | A1* | 12/2004 | Castaneda et al. | 455/341 |
| 2005/0124300 | A1* | 6/2005 | Khorram | 455/78 |
| 2006/0097811 | A1* | 5/2006 | Nakamura et al. | 331/167 |
| 2007/0007622 | A1* | 1/2007 | Liu et al. | 257/531 |
| 2008/0061874 | A1* | 3/2008 | Magoon et al. | 330/140 |
| 2008/0061875 | A1* | 3/2008 | Magoon et al. | 330/140 |

OTHER PUBLICATIONS

Talwalkar et al.: "An Integrated 5.2 GHz CMOS T/R Switch With LC-Tuned Substrate Bias", 2003 IEEE International Solid-State Circuits Conference, Paper 20.7, 10 pages.

* cited by examiner

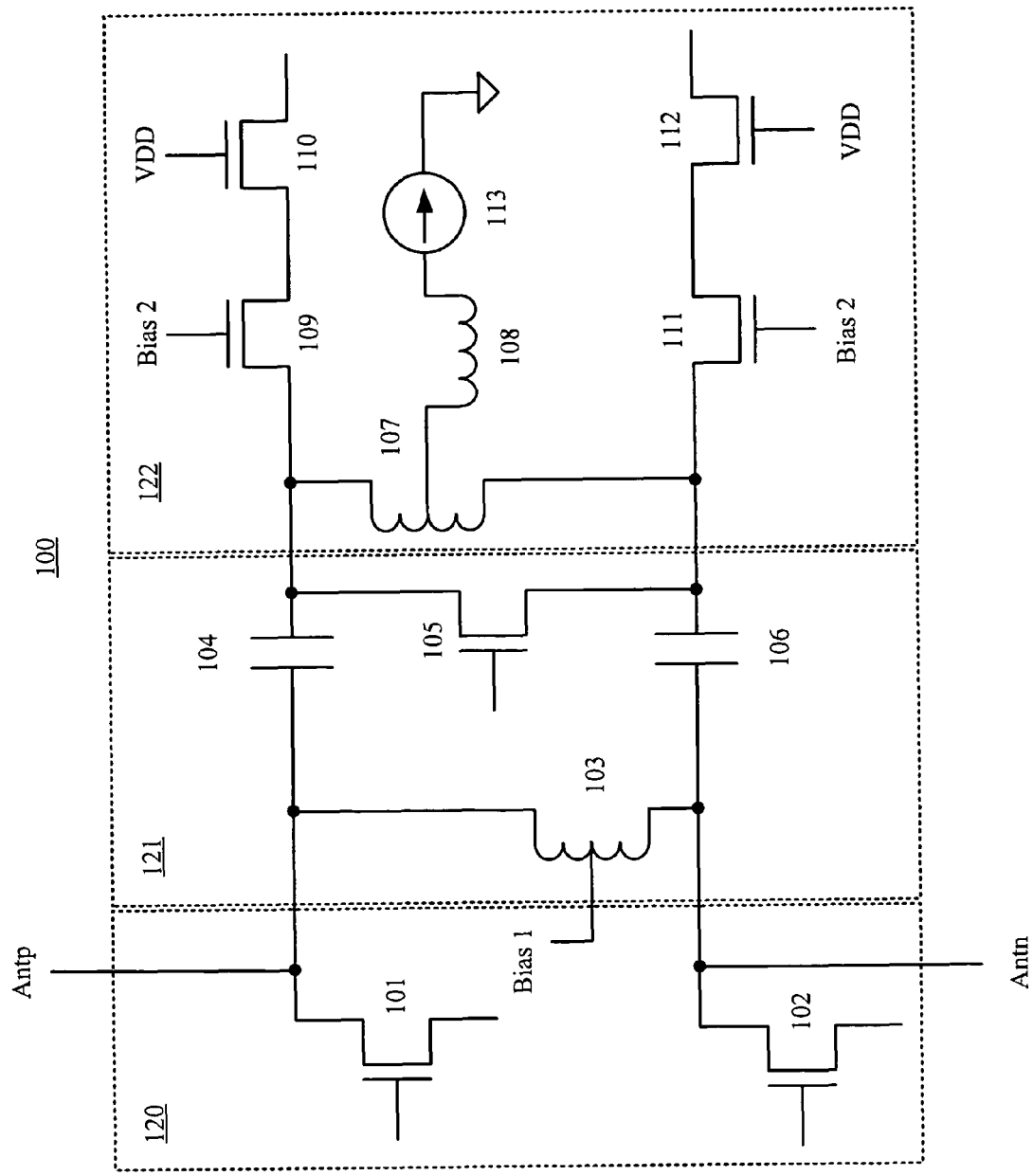

INTEGRATED TRANSMITTER/RECEIVER SWITCH WITH IMPEDANCE MATCHING NETWORK

BACKGROUND OF THE INVENTION

1. Field of the Invention

The present invention relates to a transmitter/receiver (T/R) switch and in particular to an integrated T/R switch that minimizes components and silicon area.

2. Related Art

Increasing consumer demand for a smaller and cheaper wireless device drives technology developments in the device's constituent components to achieve the desired size and cost reductions. For example, to reduce the size and cost of a transmit/receive (T/R) switch in a transceiver, manufacturers have attempted to integrate this T/R switch onto a single low cost integrated circuit. Unfortunately, such an "integrated" T/R switch may cause performance issues that offset the benefits of size and cost reductions.

Exemplary integrated T/R switches have used simple MOSFETS to implement the transmitter and receiver switches. Unfortunately, using MOSFETs to implement a standard configuration T/R switch can only work well for low power circuits. Specifically, a standard MOSFET T/R switch cannot handle large output swings from the power amplifier. Therefore, if the power amplifier uses a high supply voltage, then the MOSFET T/R switch needs to be high voltage as well. Unfortunately, this high voltage T/R MOSFET switch can cause a large, undesirable loss in at least one of the transmit and receive functions.

In an article entitled, "Integrated CMOS Transmit-Receive Switch Using LC-Tuned Substrate Bias for 2.4 GHz and 5.2-GHz Applications," IEEE Journal of Solid-State Circuits, Vol. 39, No. 6, June 2004, p. 863-870, N. Talwalkar et al. describe an integrated T/R switch that overcomes high voltage stress by using two additional inductors and a large isolation region around one of the MOSFET switches. This configuration overcomes the loss and reliability issues associated with simple MOSFET switches, but at the expense of considerable additional silicon area (e.g. on the order of one sq. mm.).

Therefore, a need arises for an integrated T/R switch that minimizes components and silicon area without sacrificing performance.

SUMMARY OF THE INVENTION

A wireless device can have a first antenna connection and a second antenna connection for differential signal transmission and receipt. An integrated transmit/receive (T/R) switch for this wireless device is described. In accordance with one aspect of the invention, a switchable inductor-capacitor-inductor (L-C-L) network, which includes the integrated T/R switch, can advantageously bridge a power amplifier (PA) and a low noise amplifier (LNA) of this wireless device.

The integrated T/R switch can include a first inductor having a first terminal and a second terminal connected between the first and second antenna connections, respectively. The integrated T/R switch can further include first and second capacitors. The first capacitor can have a first terminal and a second terminal, wherein the first terminal is connected to the first terminal of the first inductor. The second capacitor can have a first terminal and a second terminal, wherein the first terminal is connected to the second terminal of the first inductor. The second terminals of the first and second capacitors are connectable to a second inductor of the LNA for the wireless device.

Notably, the first and second inductors and the first and second capacitors can form the L-C-L network. The first inductor can function as an output inductance for the PA. In one embodiment, the first inductor can be advantageously implemented using the bond wires already attached to the PA, thereby requiring no additional inductors to provide the integrated T/R switch and minimizing use of valuable silicon area.

The second inductor can also provide significant advantages. For example, the second inductor can function as a source inductor for the LNA. Additionally, the second inductor can cancel an input parasitic capacitance of the LNA.

Similarly, the first and second capacitors can also provide significant advantages in the above-described configuration. Specifically, the first and second capacitors can act as a blocking capacitor to provide DC isolation between the LNA and the PA. Therefore, the LNA can be protected from the high voltages used in some PA configurations or embodiments.

Normally, the PA and the LNA optimally function by "seeing" different impedances. In accordance with one aspect of the invention, the L-C-L network can advantageously transform the impedance optimized for the LNA. Thus, the first and second inductors and the first and second capacitors can function as an impedance matching network for at least one of the PA and the LNA.

The integrated T/R switch can further include a transistor connected between the second terminals of the first and second capacitors. Advantageously, this transistor (acting as a transmit/receive switch), disposed between differential nodes, mitigates non-ideal behavior when closed. Moreover, the disposition of the transistor between differential nodes ensure that the first and second sides of the differential circuit receive an equal resistance approximately one-half the value of the on-state resistance of the switch transistor to a virtual ground formed therebetween.

Thus, this integrated T/R switch can advantageously eliminate the need for additional silicon space, while still ensuring optimal transmit/receive performance of the wireless device.

BRIEF DESCRIPTION OF THE FIGURE

FIG. 1 illustrates an exemplary integrated T/R switch that can advantageously minimize components and silicon area.

DETAILED DESCRIPTION OF THE FIGURE

Integrating components of a standard transmitter and a standard receiver into a single integrated circuit can result in suboptimal performance issues. To resolve these performance issues, additional components (such as inductors) and/or isolation regions around certain components can be used. Unfortunately, these solutions can significantly increase the size of the integrated circuit.

FIG. 1 illustrates an exemplary transmit/receiver (T/R) interface circuit 100 that can advantageously minimize components and silicon area while ensuring optimal performance. In this embodiment, T/R interface circuit 100 can include a power amplifier (PA) interface 120, an integrated T/R switch 121, and a low noise amplifier (LNA) interface 122. Note that PA interface 120 can form part of a power amplifier, wherein the other components of the power amplifier (e.g. a standard power amplifier) are not shown for simplicity. Similarly, LNA interface 122 can form part of a low noise amplifier, wherein the other components of the low noise amplifier (e.g. a standard LNA amplifier) are also not shown for simplicity.

Integrated T/R switch 121 connects PA interface 120 and LNA interface 122. Notably, as described in further detail below, various components that would otherwise form or be characterized as part of either PA interface 120 or LNA interface 122 can be reconfigured to implement integrated T/R switch 121. Because already existing components can be leveraged, integrated T/R switch 121 can advantageously be implemented in a small IC footprint. Moreover, these reconfigured components can ensure optimal performance of integrated T/R switch 121.

In this embodiment, power amplifier (PA) interface 120 includes two NMOS transistors 101 and 102 having their drains connected to differential antenna connections Antp and Antn, respectively. (Note that antenna connections Antp and Antn can be coupled to a common antenna through a balun. Moreover, NMOS transistors 101 and 102 may represent cascode drive transistors in a typical PA.) In this configuration, PA interface 120 acts as a toggle switch for transmit/receive functions with transmitters 101 and 102 being the active drive components. Specifically, when a high voltage is applied to the gates of transistors 101 and 102, antenna connections Antp and Antn can be used for transmitting the differential RF signals provided via the sources of transistors 101 and 102. When a low voltage is applied to the gates of transistors 101 and 102, antenna connections Antp and Antn can be used for receiving RF signals.

Integrated T/R switch 121 can include an inductor 103, two capacitors 104/106, and an NMOS transistor 105. In this embodiment, inductor 103 can have one terminal connected to antenna connection Antp and a first terminal of capacitor 104 as well as another terminal connected to antenna connection Antn and a first terminal of capacitor 106. NMOS transistor 105 can be connected between the second terminal of capacitor 104 and the second terminal of capacitor 106 and therefore is parallel to inductor 103. NMOS transistor 105 can be used in conjunction with transistors 101/102 to provide the desired transmit/receive mode. Specifically, if transistors 101/102 are conducting (in the transmit mode), then transistor 105 is also biased to conduct. Transistor 105, when conducting, shorts together the second terminals of capacitors 104/106, thereby creating a resonant tank (e.g. at 2.4 GHz) between capacitors 104/106 and inductor 103. Therefore, turning on transistor 105 effectively renders LNA interface 122 and its receive capabilities inactive.

Advantageously, NMOS transistor 105 (acting as a transmit/receive switch), disposed between differential nodes, mitigates non-ideal behavior when closed. Moreover, the disposition of NMOS transistor 105 between differential nodes ensure that the first and second sides of the differential circuit receive an equal resistance approximately one-half the value of the on-state resistance of the switch transistor to a virtual ground formed therebetween.

In this embodiment, LNA interface 122 can include inductors 107/108, a plurality of NMOS transistors 109-112, and a current source 113. Inductor 107 can be connected between the second terminal of capacitor 104 and the second terminal of capacitor 106 and therefore is also connected in parallel to inductor 103 of integrated T/R switch 121. NMOS transistors 109 and 110 can be connected in series to the second terminal of capacitor 104 whereas NMOS transistors 111 and 112 can be connected in series to the second terminal of capacitor 106. Transistors 109 and 111 (with their gates receiving a Bias 2 voltage to generate a predetermined input impedance) can function as the differential pair for the common gate of LNA interface 122, whereas transistors 110 and 112 (with their gates receiving voltage VDD) can serve as cascode devices of LNA interface 122. One terminal of inductor 108 can be connected to the midpoint of inductor 107 (note that in an alternative embodiment, inductor 107 can be implemented as two separate inductors) whereas another terminal of inductor 108 can be connected to a current source 113 (which in turn can be connected to ground). Current source 113 biases LNA interface 121.

Advantageously, the L-C-L network formed by inductor 103, capacitors 104/106, and inductor 107 can be implemented with components already existing in a current power amplifier/low noise amplifier. For example, an inductor would already be provided to function as a source inductor for a low noise amplifier. Inductor 107 can perform this function albeit in a different configuration than that used in a typical low noise amplifier. Specifically, inductor 107 is coupled in parallel to the antenna connections (rather than in series as in a typical common source LNA topology) and therefore can perform both as a source inductor for LNA interface 122 as well as a shunt element. That is, inductor 107 can advantageously resonate out (i.e. cancel) the input parasitic capacitance of LNA interface 122.

Notably, inductor 103 (which can perform as an RF choke to provide power to the power amplifier) can be implemented using the bond wires typically attached to power amplifier interface 120. Thus, integrated T/R switch 121 can eliminate the need for an additional inductor, which can take up valuable silicon area. Note that inductor 103 can provide the biasing for the power amplifier using a Bias 1 voltage.

Note that capacitors 104/106 (and transistor 105) can form part of a standard low noise amplifier. However, their configuration with respect to inductors 103 and 107 allows the formation of a minimally sized L-C-L network. Notably, without this L-C-L network, a much larger blocking capacitor would be needed in front of LNA interface 122 (which has an input impedance of 50 Ohms or lower). In one embodiment, inductor 103 can have an inductance of 1.5 nH, capacitors 104/106 can have a capacitance of 3.5 pF, and inductor 107 can have an inductance of 1.8 nH (or comprise two inductors, each inductor having an inductance of 0.9 nH).

Advantageously, the L-C-L network can also ensure DC isolation between PA interface 120 and LNA interface 122, which serves to protect the low noise amplifier from large voltages. Specifically, capacitors 104/106 can act as blocking capacitors so that LNA interface 122 does not see high voltages from PA interface 120.

Notably, the L-C-L network can also provide an impedance transformation. That is, in T/R interface circuit 100, PA interface 120 and LNA interface 122 are connected to the same antenna connections, i.e. Antp and Antn. Therefore, the matching external network must have the same impedance. Normally, PA interface 120 and LNA interface 122 optimally function by "seeing" different impedances. In accordance with one aspect of the invention, the L-C-L network can advantageously transform the impedance "seen" by LNA interface 122 to an impedance better optimized by LNA interface 122.

Thus, by reconfiguring existing components associated with a power amplifier and a low noise amplifier, integrated T/R switch 121 can advantageously eliminate the need for additional silicon space, while still ensuring optimal performance of T/R interface circuit 100. For example, using expensive, external components in standard configurations, a receive chain could have composite noise figure of 5.5-5.7 dB. In contrast, using integrated T/R switch 121 and its associated L-C-L network, a receive chain could have comparable composite noise figure of 7.5-7.7 dB.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A method of providing an integrated transmitter/receiver switch for a wireless device, the method comprising:
    using a switchable inductor-capacitor-inductor (L-C-L) network to bridge a power amplifier and a low noise amplifier, wherein a first inductor functions as an output inductance for the power amplifier, and the first inductor consists of bond wires attached to the power amplifier, wherein a second inductor functions as a source inductor for and cancels an input parasitic capacitance of the low noise amplifier.

2. The method of claim 1, wherein the low noise amplifier has a common gate structure.

3. The method of claim 1, wherein a capacitor set acts as a blocking capacitor to provide DC isolation between the low noise amplifier and the power amplifier.

4. The method of claim 1, wherein the L-C-L network functions as an impedance matching network for at least one of the power amplifier and the low noise amplifier.

5. A transmitter/receiver (T/R) interface circuit comprising:
    a power amplifier interface including:
        a first transistor for transmitting a positive differential signal to a first antenna connection; and
        a second transistor for transmitting a negative differential signal to a second antenna connection;
    an integrated T/R switch including:
        a first inductor having a first terminal and a second terminal connected between the first and second antenna connections, respectively;
        a first capacitor having a first terminal and a second terminal, the first terminal being connected to the first terminal of the first inductor;
        a second capacitor having a first terminal and a second terminal, the first terminal being connected to the second terminal of the first inductor; and
        a third transistor connected between the second terminals of the first and second capacitors; and
    a low noise amplifier interface including:
        a second inductor having a first terminal and a second terminal connected to the second terminals of the first and second capacitors, respectively.

6. The T/R interface circuit of claim 5, wherein the low noise amplifier interface has a common gate structure.

7. The T/R interface circuit of claim 5, wherein the first inductor functions as an output inductance for the power amplifier interface.

8. The T/R interface circuit of claim 7, wherein the first inductor is implemented using bond wires attached to the power amplifier interface.

9. The T/R interface circuit of claim 5, wherein the second inductor functions as a source inductor for and cancels an input parasitic capacitance of the low noise amplifier interface.

10. The T/R interface circuit of claim 5, wherein the first and second capacitors act as a blocking capacitor set to provide DC isolation between the low noise amplifier interface and the power amplifier interface.

11. The T/R interface circuit of claim 5, wherein the first and second inductors and the first and second capacitors function as an impedance matching network for at least one of the power amplifier interface and the low noise amplifier interface.

12. An integrated transmit/receive (T/R) switch for a wireless device, the wireless device having a first antenna connection and a second antenna connection for differential signal transmission/receipt, a power amplifier, and a low noise amplifier (LNA), the integrated T/R switch comprising:
    a first inductor having a first terminal and a second terminal connected between the first and second antenna connections, respectively;
    a first capacitor having a first terminal and a second terminal, the first terminal being connected to the first terminal of the first inductor;
    a second capacitor having a first terminal and a second terminal, the first terminal being connected to the second terminal of the first inductor; and
    a transistor connected between the second terminals of the first and second capacitors,
    wherein the second terminals of the first and second capacitors are connectable to a second inductor of the low noise amplifier for the wireless device, the first and second inductors and the first and second capacitors forming an L-C-L network.

13. The integrated T/R switch of claim 12, wherein the first inductor functions as an RF choke that provides power to the power amplifier.

14. The integrated T/R switch of claim 12, wherein the first inductor is implemented using bond wires attached to the power amplifier.

15. The integrated T/R switch of claim 12, wherein the second inductor functions as a source inductor for and cancels an input parasitic capacitance of the low noise amplifier.

16. The integrated T/R switch of claim 12, wherein the first and second capacitors act as a blocking capacitor to provide DC isolation between the low noise amplifier and the power amplifier.

17. The integrated T/R switch of claim 12, wherein the first and second inductors and the first and second capacitors function as an impedance matching network for at least one of the power amplifier and the low noise amplifier.

* * * * *